United States Patent

Moody et al.

[15] 3,668,744

[45] June 13, 1972

[54] CONNECTOR CLIP

[72] Inventors: Roy A. Moody, Flossmoor; John F. Sullivan, South Holland; Arlie J. Thayer, Tinley Park, all of Ill.

[73] Assignee: Panduit Corp., Tinley Park, Ill.

[22] Filed: Oct. 21, 1970

[21] Appl. No.: 82,699

[52] U.S. Cl. ............................24/73 PB, 24/23 B, 248/68
[51] Int. Cl. ............................B65d 63/06, A44b 21/00
[58] Field of Search............24/73 CC, 81 CC, 73 PB, 23 B, 24/16 PB; 248/68

[56] References Cited

UNITED STATES PATENTS

| | | | |
|---|---|---|---|
| 172,845 | 2/1876 | Burrow et al. | 24/23 B |
| 174,707 | 3/1876 | Slattery | 24/23 B |
| 320,420 | 6/1885 | Warren | 24/23 B |
| 2,104,755 | 1/1938 | Masino et al. | 24/23 B |
| 3,486,725 | 12/1969 | Hidassy | 248/68 |

*Primary Examiner*—Donald A. Griffin
*Attorney*—Evan D. Roberts

[57] ABSTRACT

A connector clip for linking a pair of looped straps holding bundles of wires or similar items including, a solid walled passage, and an open walled passage, the open walled passage being adapted to clip onto a primary strap in an already looped position after which the second strap is placed longitudinally through the closed passage prior to looping around a second bundle of wires.

16 Claims, 6 Drawing Figures

PATENTED JUN 13 1972 3,668,744

INVENTORS
ROY A. MOODY
JOHN F. SULLIVAN
ARLIE J. THAYER

BY D. James Bader
ATTORNEY

CONNECTOR CLIP

The present invention relates to connector clips and more particularly is directed to a novel connector clip for linking a pair of straps such as cable ties wrapped in continuous loops around two bundles of wires thereby physically linking the two bundles of wires disposed in parallel relationship on a panel board of the like.

In the electrical industry, especially in the assembly of wires on panel boards and in computers, bundles of wires are often run parallel to each other and it is desirable to fasten these bundles together to maintain them in parallel relationship for purposes of neatness and durability of the apparatus. The bundles themselves are formed by employing elongated straps referred to in the art as cable ties. These cable ties are self-locking and are fastened or looped around the bundle at suitable intervals under considerable tension in a manner well known in the art.

In many applications a primary or first bundle of wires is applied to a panel board and some time later a second bundle is applied. When the second bundle is later applied it is also formed by fastening cable ties around the bundle at predetermined intervals. In the prior art, when it was desired to link the straps of two parallel bundles on a panel board, a plastic ring called a connector ring was utilized. A connector ring is rectangular and has a single opening therein through which the straps from each bundle pass side by side. In order to link the two bundles, it is necessary to either cut and remove the cable ties from the primary bundle and replace them after sliding a connector ring onto the new strap, or to add a new cable tie beside the existing cable tie after threading it through the connector ring. The secondary strap is then looped through the same passage or opening in the connector ring and is fastened about the secondary bundle.

Since the cable ties once fastened and trimmed are not normally reusable, the prior art method of linking parallel bundles involves wasting one cable tie at each point of linkage and, if the old cable tie is removed, a considerable amount of time is lost during linking of the bundles due to the care which must be used to sever the original cable tie without damaging the wires in the bundle. While the cost of each such operation is not great, it becomes quite significant when it occurs millions of times per year.

The connector clip of the present invention solves the problem of the prior art by providing a clip which can be applied to the original cable tie of the primary bundle without removal or loosening of the cable tie thus resulting in a savings in time and in cost when it is desired to link a secondary bundle to an earlier formed primary bundle.

It is an object of the present invention to provide a connector clip for linking a pair of straps one of which is preformed into a closed loop.

It is a further object of the present invention to provide a connector clip for linking a cable tie on a primary bundle of wires to a cable tie for a secondary bundle of wires being formed, without removal of the cable tie on the primary bundle of wires.

These and other objects of the present invention will become evident in connection with the following detailed description of the invention taken together with the drawings in which.

Figure 1:
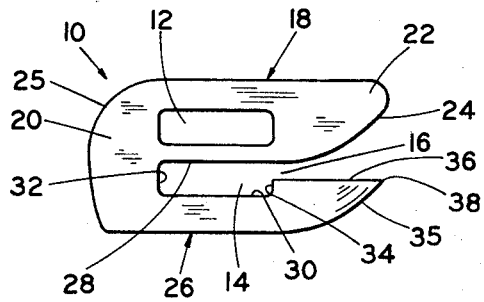
FIG. 1 is a front elevational view of a connector clip embodying the present invention.
Figure 2:
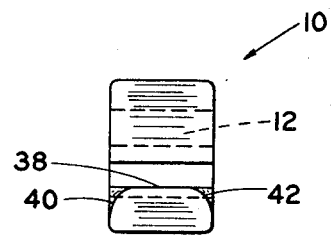
FIG. 2 is an end view of the connector clip illustrated in FIG. 1.
Figure 3:
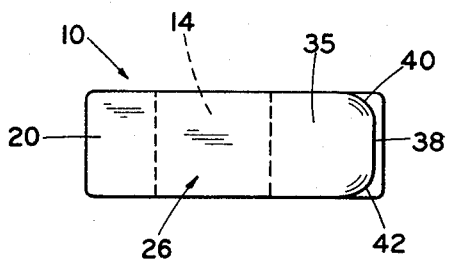
FIG. 3 is a bottom view of the connector clip illustrated in FIG. 1.

Briefly, the illustrated embodiment is a connector clip 10 having a profile as viewed in FIG. 1 resembling a lower case letter "e." It is with reference to the orientation of FIG. 1 that the following description is written. The clip 10 is preferably made of plastic material such as Nylon although other materials could be employed, and includes a first strap receiving passage 12 having completely closed side walls, and a second strap receiving passage 14 having an opening 16 in one side wall. The clip 10 is formed of a unitary piece of material of constant width and the passages 12 and 14 are disposed with their axes in parallel relationship across the width of the clip (FIGS. 2 and 3). In applying the clip to a primary bundle the opening 16 in the side wall of the second strap receiving passage 14 is placed around the edge of the primary strap and is forced laterally onto the strap until the strap is locked in the passage 14 in a snapping action. The strap for the secondary bundle is then inserted longitudinally through the passage 12 and is looped around the second bundle and fastened resulting in the configuration shown in FIG. 6. The construction of the clip 10 in addition to providing an open sided passage for receiving a strap of the primary bundle includes many features which assist in the installation of the clip under the strap and the retention of the strap after the two bundles are linked.

The first strap receiving passage 12 as mentioned earlier is, in the illustrated embodiment, completely closed walled, and is formed by a body illustrated as a closed ring 18 with its center open to form the generally rectangular passage 12 therethrough. The outer periphery of the closed ring is non-uniform in profile with each portion having a specific function relating to the overall application of the clip. In particular, as viewed in FIG. 1, the top and bottom walls of the ring 18 are much thinner than the end walls in order to provide a compact link and to place the passages 12 and 14 as close as possible to each other. The end walls, on the other hand, are much thicker than the top and bottom walls for important functional reasons. The left end wall 20 is thick because it serves as a structural mounting for the portion of the connector clip which forms the open walled second strap receiving passage 14 which will be described in detail hereinafter. The right end wall 22 as viewed in FIG. 1 is also of substantial thickness and is formed on its underside with a curved surface 24 which curves upwardly beyond the passage 12 toward the upper surface of the ring to assist in the insertion of the clip under a strap of the primary bundle in a manner hereinafter described. The upper left-hand corner of the ring 18 is curved on its outer surface to form a bearing surface 25 for pushing the clip onto the primary strap.

The second strap receiving passage 14 is formed by a cantilever jaw 26 extending along and spaced from the lower peripheral surface of the closed ring 18 as viewed in FIG. 1. The passage 14 is also of generally rectangular configuration and has a first side 28 formed by the lower peripheral surface of the ring 18, a second side 30 formed by the inner surface of the cantilever jaw 26 parallel to the first side, a third side 32 defined by an integral thick walled extension in a downward direction, as viewed in FIG. 1, of the left end wall 20 of the closed ring 18, and a fourth side 34 projecting from the second side 30 in an upward direction toward a second point on the periphery of the closed ring 18. It is this fourth side 34 which terminates short of the periphery of the ring 18 to define the opening 16 mentioned earlier. The overall height and width of the strap passage 14 is designed to receive a particular size of strap or cable tie. The width of the opening 16, on the other hand, is designed to be somewhat less than the thickness of the strap inserted in the passage 14 thus resulting in a retention of the strap in the passage after its insertion.

The bottom or outer surface of the cantilever jaw 26 is tapered upwardly toward the closed ring 18 from the fourth side 34 of the passage 14 to its extremity. A flat lead surface 36, extending outwardly perpendicular to and from the upper terminus of the fourth side 34 of the passage 14, intersects the curved lower surface 35 of the cantilever jaw beyond the fourth side 34 and below the curved surface 24 of the ring 18 referred to earlier to form a sharp edge 38 which assists in the insertion of the clip on the primary bundle. The lead surface 36 and the curved surface 24 of the ring 18 diverge from the opening 16 to form a mouth which, at its outer extremity, is wider than either the opening 16 or the thickness of the strap to which the clip is to be applied. This diverging mouth is employed to assist in the initial insertion of one edge of the primary strap laterally into the opening 16 after the edge 38 is forced under the strap thus assisting in the application of the clip to the primary bundle.

Since the primary strap is usually affixed under considerable tension and is curved around the bundle, it is often difficult to initiate insertion of the clip even with the edge 38 and the diverging mouth. Accordingly, the sides 40 and 42 of the cantilever jaw 26 are tapered inwardly as they reach the edge 38. As can best be seen from FIGS. 2 and 3, this tapering results in a narrower edge 38 which does not span as much of the curvature of the primary strap, resulting in easier insertion of the clip on the primary bundle.

Figure 4:
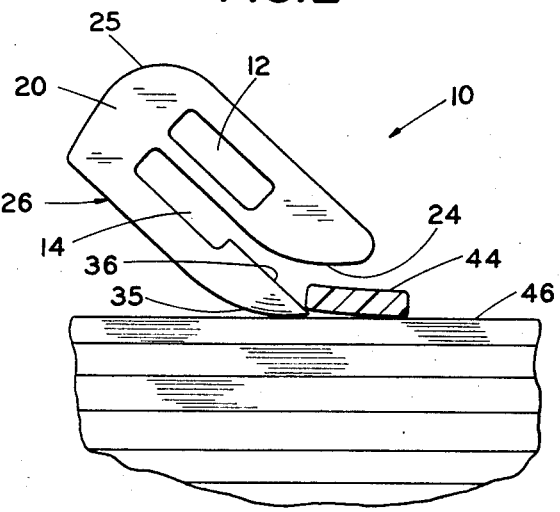
FIG. 4 is a side elevational view of a connector clip being applied to a primary bundle.
Figure 5:
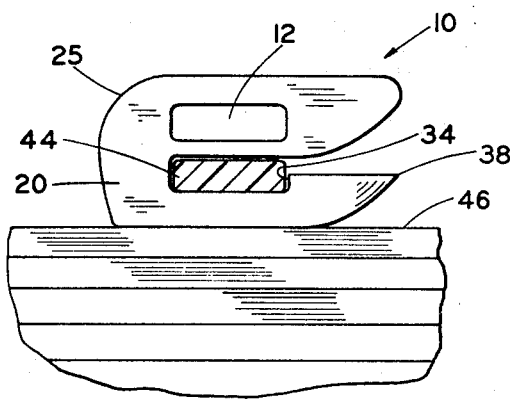
FIG. 5 is a side elevational view of a connector clip installed on a primary bundle.
Figure 6:
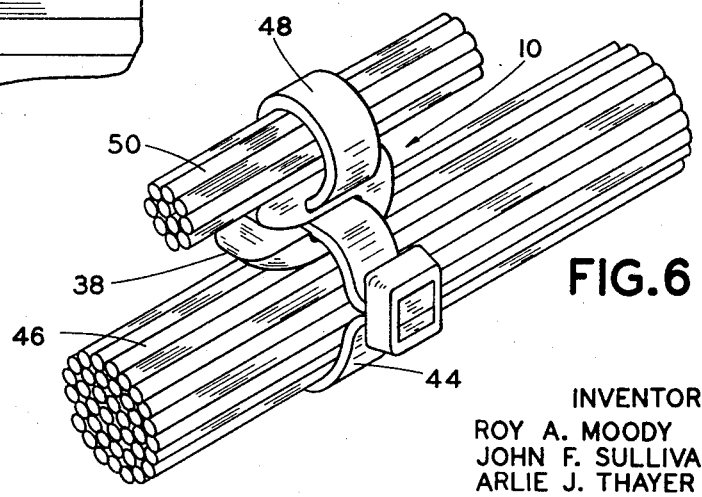
FIG. 6 is a perspective view of a connector clip installed and linking a primary and a secondary bundle.

FIGS. 4, 5 and 6 illustrate the application of the clip 10 of the present invention to link primary and secondary bundles of wires. In FIG. 4 the clip 10 is at the first stage of insertion under a primary strap 44 on a primary bundle 46. The installation of the clip is initiated by inserting the edge 38 under one edge of the primary strap 44 with the clip tipped upward at an angle to the wires in the bundle and resting on the surface of the bundle at the curved lower surface 35 of the jaw. In this position the strap 44 is at the widest point of the diverging mouth defined by the curved surface 24 and the lead surface 36. After the edge 38 is inserted under the strap, downward and lateral pressure is exerted manually on the curved bearing surface 25 which, as can be seen, is diametrically opposite the edge 38 on the clip.

As the clip moves, the strap 44 is forced into the mouth until it engages the opening 16 at both the lead surface 36 and the curved surface 24 of the opening. As the pressure is continued, the strap 44 causes the opening 16 to expand by elastic deformation of the cantilever jaw 26. When the opening is sufficiently wide, the strap 44 passes into the second strap receiving passage 14 as the clip 10 moves to an upright position (FIG. 5) in a rocking motion due to the downward and lateral pressure on the bearing surface 25. As the trailing edge of the strap 44 is cleared by the opening 16, the distorted clip quickly snaps back to its original position due in part to the thickness of the left wall 20 and the strap is retained in the passage 14 by the fourth side 34 of the passage which partially closes the opening 16. It should be noted that the curvature of the lower surface assists in the entire foregoing operation by preventing the edge 38 from cutting into the wires of the bundle.

At this point, the clip is fully installed on the primary bundle and an unlooped secondary strap 48 is threaded through the first strap receiving passage 12 and is wrapped around a secondary bundle 50 and tightened. The resulting assembly, shown in perspective in FIG. 6, maintains the two bundles in generally parallel side by side alignment at a single point along their lengths. Similar connector clips are applied at suitable intervals along the respective bundles to link the bundles together throughout their entire parallel length.

The connector clip of the present invention although reusable is difficult to remove from the primary bundle once it has been applied. Thus, the clip provides a relatively permanent connection between the respective bundles which is not easily disturbed by the handling of the apparatus due to shipping or other movements. It is also possible to utilize a single size of clip for several sizes of straps so long as the straps are not wider than the passages 12 and 14, which would prevent insertion of the secondary strap and locking of the primary strap in the passage.

It is also possible to form the clip of the present invention to join bundles of wires or other objects which cross each other rather than being oriented in parallel relationship. This embodiment is similar in construction to that of the illustrated embodiment except that the first strap receiving passage 12 is disposed at 90° to the open-sided strap receiving passage 14. It is also possible to provide two open-sided strap receiving passages having their open sides oppositely disposed so that the clip is generally S-shaped. Such a clip could be employed to link primary and secondary bundles in which the strap on the secondary bundle was applied prior to the linking of the two bundles together. The two foregoing configurations have not been illustrated in the drawings.

Various other modifications and structural changes within the scope of the present invention will occur to those skilled in the art. The scope of the present invention is limited only by the scope of the appended claims.

What is claimed is:

1. A connector clip for linking a pair of straps such as cable ties, at least one of said straps being a closed looped strap, said clip comprising a body having a first strap passage adapted to receive and retain a strap passing longitudinally therethrough, and a cantilever jaw having an inner surface and an outer surface, said inner surface extending along and spaced from a portion of the outer periphery of said body to define a second passage adapted to receive a strap, said jaw having a first end integrally formed at one point on the outer periphery of said body and an outer end spaced slightly from a second point on the outer periphery of said body to define an opening communicating with said second passage for the insertion of the closed looped strap laterally into said second passage without opening the closed loop strap, said second passage having a first side formed by a portion of the outer periphery of said body, a second side formed by the inner surface of said cantilever jaw, a third side depending from said body connecting said first and second sides, and a fourth side projecting from said second side adjacent said outer end toward said second point on the periphery of said body, and wherein said fourth side terminates short of said second point to form said opening, the outer end of said jaw beyond said fourth side being tapered to form an edge to assist in inserting said clip under a strap tightly in place around a bundle of wires without loosening the strap, the lateral sides of said outer end taper toward each other approaching said edge to provide an edge of substantially smaller width than the width of the remainder of said clip whereby insertion of said clip under a tight strap is further assisted.

2. A connector clip as set forth in claim 1 wherein said body comprises a closed ring so that said first strap passage is a closed walled passage adapted to receive a strap prior to forming the strap into a closed loop.

3. A connector clip as set forth in claim 2 wherein said passages are of generally rectangular configuration having their longer dimensions corresponding to the width of the straps disposed in planes generally parallel to each other.

4. A connector clip as set forth in claim 2 wherein the axes of the respective first and second passages are generally parallel whereby the loops formed by the respective straps are disposed in generally the same plane.

5. A connector clip as set forth in claim 2 wherein said opening is substantially smaller than the distance between said first and second sides and smaller than the thickness of said one of said straps whereby insertion of said one of said straps into said second passage requires flexure of said cantilever jaw relative to said first side.

6. A connector clip as set forth in claim 5 wherein said third side of said second passage is of substantially greater thickness than said first and second sides to provide adequate strength during the flexure of said cantilever jaw.

7. A connector clip as set forth in claim 5 wherein the outer end of said jaw and the outer periphery of said closed ring diverge beyond the plane of said fourth side to form a diverging mouth for initiating the insertion of a looped strap through said opening into said second passage.

8. A connector clip as set forth in claim 7 wherein said diverging mouth is formed by a flat lead surface on the outer end of said jaw disposed parallel to said first and second sides of said second passage and by a curved portion of the outer periphery of said closed ring diverging from said lead surface beyond said second point.

9. A method of linking a secondary bundle of wires to a primary bundle of wires having a closed looped strap maintaining said primary bundle of wires in bundled relationship, said method comprising the steps of providing a connector clip having two strap receiving passages one of which has an opening in one wall, snapping the connector clip onto the closed looped strap on said primary bundle without removal of said closed looped strap from said primary bundle, inserting a second strap through said connector clip, and locking said second strap about said secondary bundle to form a closed loop.

10. The method of claim 9 wherein said closed looped strap has a predetermined thickness and said opening is smaller than said thickness, said step of snapping the connector clip onto the closed looped strap includes flexure of said wall relative to the other of said passages.

11. A connector clip for linking a pair of straps such as cable ties, at least one of said straps being a closed looped strap, said clip comprising a body having a first strap passage adapted to receive and retain a strap passing longitudinally therethrough, and a cantilever jaw having an inner surface and an outer surface, said inner surface extending along and spaced from a portion of the outer periphery of said body to define a second passage adapted to receive a strap, said jaw having a first end integrally formed at one point on the outer periphery of said body and an outer end spaced slightly from a second point on the outer periphery of said body to define an opening communicating with said second passage for the insertion of the closed looped strap laterally into said second passage without opening the closed looped strap, said second passage having a first side formed by a portion of the outer periphery of said body, a second side formed by the inner surface of said cantilever jaw, a third side depending from said body connecting said first and second sides, and a fourth side projecting from said second side adjacent said outer end toward said second point on the periphery of said body, and wherein said fourth side terminates short of said second point to form said opening, the outer end of said jaw beyond said fourth side being tapered to form an edge to assist in inserting said clip under a strap lightly in place around a bundle of wires without loosening the strap, the outer end of said jaw comprising a flat lead surface extending perpendicular to and from the terminus of the fourth side of said second passage, said outer surface of said jaw being curved upwardly to intersect said lead surface forming said edge, whereby insertion of said clip under said looped strap is facilitated without said edge cutting into the wires.

12. A connector clip as set forth in claim 11 wherein the outer periphery of said body diametrically opposite said second point is curved to provide a bearing surface to assist in manual insertion of said clip under a tightly looped strap.

13. A connector clip as set forth in claim 11 wherein said opening is substantially smaller than the distance between said first and second sides and smaller than the thickness of said one of said straps whereby insertion of said one of said straps into said second passage requires flexure of said cantilever jaw relative to said first side.

14. A connector clip as set forth in claim 13 wherein the outer end of said jaw and the outer periphery of said body diverge beyond the plane of said fourth side to form a diverging mouth for initiating the insertion of a looped strap through said opening into said second passage.

15. A connector clip as set forth in claim 14 wherein said diverging mouth is formed by a flat lead surface on the outer end of said jaw disposed parallel to said first and second sides of said second passage and by a curved portion of the outer periphery of said body diverging from said lead surface beyond said second point.

16. A connector clip for linking a pair of straps such as cable ties, at least one of said straps being a closed looped strap, said clip comprising a body having a first strap passage adapted to receive and retain a strap passing longitudinally therethrough, and a cantilever jaw having an inner surface and an outer surface, said inner surface extending along and spaced from a portion of the outer periphery of said body to define a second passage adapted to receive a strap, said jaw having a first end integrally formed at one point on the outer periphery of said body and an outer end spaced slightly from a second point on the outer periphery of said body to define an opening communicating with said second passage for the insertion of the closed looped strap laterally into said second passage without opening the closed looped strap, said second passage having a first side formed by a portion of the outer periphery of said body, a second side formed by the inner surface of said cantilever jaw, a third side depending from said body connecting said first and second sides, and a fourth side projecting from said second side adjacent said outer end toward said second point on the periphery of said body, and wherein said fourth side terminates short of said second point to form said opening, said opening being substantially smaller than the distance between said first and second sides and smaller than the thickness of said one of said straps whereby insertion of said one of said straps into said second passage requires flexure of said cantilever jaw relative to said first side.

* * * * *

UNITED STATES PATENT OFFICE
CERTIFICATE OF CORRECTION

Patent No. 3,668,744            Dated June 13, 1972

Inventor(s) Roy A. Moody, Arlie J. Thayer, & John F. Sullivan

It is certified that error appears in the above-identified patent and that said Letters Patent are hereby corrected as shown below:

Column 1,     line 7:        "of" should be --or--;

Column 5, line 40 (Claim 11, line 24):
                         "lightly" should be --tightly--.

Signed and sealed this 9th day of January 1973.

(SEAL)
Attest:

EDWARD M. FLETCHER, JR.          ROBERT GOTTSCHALK
Attesting Officer                Commissioner of Patents